(12) United States Patent
Karlsson et al.

(10) Patent No.: US 6,819,926 B2
(45) Date of Patent: Nov. 16, 2004

(54) SYSTEM AND METHOD FOR PROVIDING PROTECTION FROM AN OVERLOAD CONDITION WITHIN THE HOME LOCATION REGISTER

(75) Inventors: Bernt Karlsson, Sollentuna (SE); Niklas Gustafsson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 487 days.

(21) Appl. No.: 09/922,986

(22) Filed: Aug. 3, 2001

(65) Prior Publication Data

US 2003/0027571 A1 Feb. 6, 2003

(51) Int. Cl.[7] .................................................. H04Q 7/20
(52) U.S. Cl. .................... 455/433; 455/434; 455/435.1; 455/453; 455/560
(58) Field of Search .............................. 455/433, 432.1, 455/434, 435.1, 435.2–3, 436, 437, 438–445, 453, 456.1, 456.2, 456.3, 456.6, 512, 423, 458

(56) References Cited

U.S. PATENT DOCUMENTS

| 4,670,899 A | * | 6/1987 | Brody et al. ................. 455/453 |
| 5,097,499 A | * | 3/1992 | Cosentino ................. 455/435.1 |
| 5,548,533 A | * | 8/1996 | Gao et al. .................... 455/453 |
| 5,561,840 A |   | 10/1996 | Alvesalo et al. ............ 455/33.1 |
| 5,642,398 A |   | 6/1997 | Tiedemann, Jr. et al. ..... 379/57 |
| 5,713,073 A |   | 1/1998 | Warsta ....................... 455/56.1 |
| 5,867,787 A |   | 2/1999 | Vudali et al. ................ 455/445 |
| 5,889,770 A |   | 3/1999 | Jokiaho et al. ............. 370/337 |
| 6,021,327 A | * | 2/2000 | Nguyen et al. .............. 455/433 |
| 6,055,433 A | * | 4/2000 | Yuan et al. .................. 455/453 |
| 6,091,953 A | * | 7/2000 | Ho et al. ..................... 455/433 |
| 6,138,016 A | * | 10/2000 | Kulkarni et al. ............ 455/433 |
| 6,275,695 B1 | * | 8/2001 | Obhan ......................... 455/423 |
| 6,275,708 B1 | * | 8/2001 | Lahtinen ..................... 455/458 |
| 6,314,291 B1 | * | 11/2001 | Fujimichi .................... 455/433 |
| 6,356,767 B2 | * | 3/2002 | Froula ......................... 455/512 |
| 6,366,780 B1 | * | 4/2002 | Obhan ......................... 455/453 |
| 6,463,286 B1 | * | 10/2002 | Salminen ..................... 455/453 |
| 6,597,682 B1 | * | 7/2003 | Kari ............................ 455/512 |

* cited by examiner

*Primary Examiner*—William Trost
*Assistant Examiner*—Joseph Nguyen (57) ABSTRACT

A telecommunications system and method is disclosed for managing congestion in the Home Location Register (HLR). At regular intervals or in response to a registration message associated with a Mobile Station (MS) registration request, the HLR can transmit the current load conditions in the HLR to one or more Mobile Switching Centers (MSC's) within the area served by the HLR. In response, the MSC's can use this load information to reduce the registration intensity in order to protect the HLR from congestion. Each MSC can include one or more HLR load thresholds, and if the current load level in the HLR is above one of these thresholds, the MSC can reduce the number of registration messages sent to the HLR by a certain amount.

23 Claims, 5 Drawing Sheets

SYSTEM AND METHOD FOR PROVIDING PROTECTION FROM AN OVERLOAD CONDITION WITHIN THE HOME LOCATION REGISTER

BACKGROUND OF THE PRESENT INVENTION

1. Field of the Invention

The present invention relates generally to cellular telecommunications systems and methods, and specifically to home location registers within cellular telecommunications systems.

2. Description of Related Art

A conventional cellular network is made up of a plurality of areas, each with a Mobile Switching Center (MSC) and Visitor Location Register (VLR) therein. The VLR is a database maintaining information about each of the mobile subscribers currently located within the MSC/VLR area. The MSC provides a circuit switched connection of speech and signaling information between a Mobile Station (MS) and the network. It should be understood that, as termed herein, the MS is the physical equipment, e.g., a car phone or other portable phone, used by mobile subscribers to communicate with the cellular network, each other, and users outside the subscribed network, both wireline and wireless.

The MSC/VLR areas, in turn, include a plurality of Location Areas (LA), which are defined as that part of an MSC/VLR area in which the MS may move freely without having to send update location information to the MSC that controls the LA. Each LA is further divided into a number of cells. Each cell includes a base station, which is responsible for providing radio coverage to the cell. Signaling information and voice or data is transmitted between the base station and the MS over the air interface.

The cellular network also includes a Home Location Register (HLR), which is a database maintaining all subscriber information, e.g., user profiles, current location information, International Mobile Subscriber Identity (IMSI) numbers, and other administrative information, for subscribers registered within that network. The HLR may be standalone or co-located with a given MSC, integrated with the MSC, or alternatively can service multiple MSC's.

Each base station broadcasts the LA associated with the cell that the base station is located in. Each MS stores the current LA therein. When the MS determines that the LA has changed from the stored LA, the MS performs a location registration.

Figure 1:
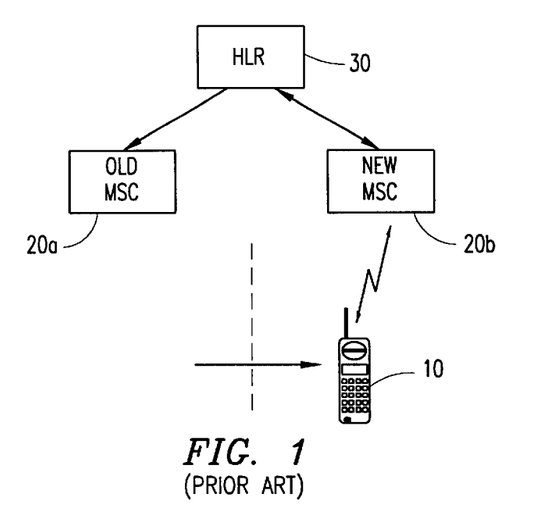
FIG. 1 is a block diagram illustrating the nodes involved in a conventional location registration process.
Figure 2:
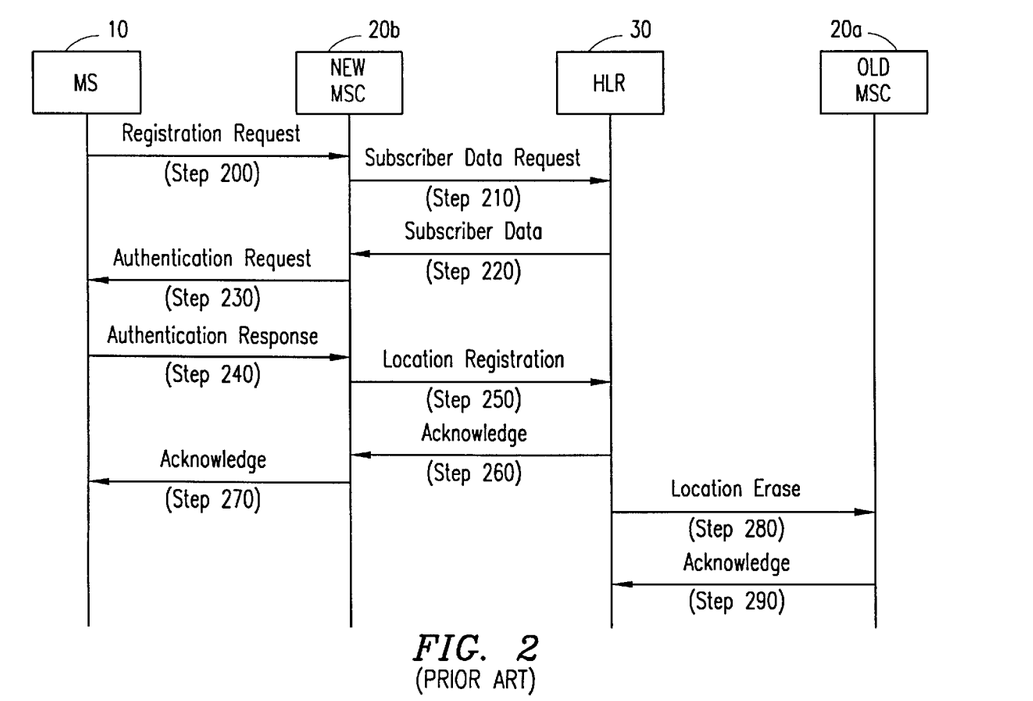
FIG. 2 is a signaling diagram illustrating a conventional location registration process.

With reference now to FIG. 1 of the drawings, which will be described in connection with FIG. 2 of the drawings, the signaling involved in a typical location registration process is illustrated. Upon receiving a location registration request from an MS 10 (step 200), the MSC 20b requests subscriber data associated with that MS 10 from the HLR 30 (step 210). In response, the HLR 30 transmits the requested subscriber data back to the MSC 20b (step 220), which uses the subscriber data to authenticate the MS 10 (steps 230 and 240). Thereafter, the MSC 20b updates the HLR 30 with the new MSC 20b identity information (step 250), which is used by the HLR 30 to route incoming calls to the MS 10. The HLR 30 acknowledges the receipt of the new MSC 20b identity to the MSC 20b (step 260), which in turn, acknowledges the registration request to the MS 10 (step 270). Finally, the HLR 30 informs the old MSC 20a that the MS 10 was previously registered with that the MS 10 has left the old MSC 20a, and instructs the old MSC 20a to erase the MS 10 subscriber data from it's VLR (steps 280 and 290).

After a system restart in an MSC or upon first initialization of the MSC, the MSC is typically accessed by a large number of MS's requesting location registration, since the broadcasted LA information that the MS receives has changed (due to e.g. the MS moving to a new LA or reorganization of the LA's) to the new LA's that the MSC serves. For PDC systems, at restart, the MS's at the MSC service border roam to the neighboring MSC while the serving MSC is down and roam back when service is available again. This means that a large number of subscriber data requests and MSC identity signals may be sent from the MSC to the HLR, which may overload the central processor (CP) in the HLR.

The signaling between the MSC and the HLR is implemented on the Mobile Application Protocol (MAP) MAP uses the Mobile Transport Protocol (MTP) as the transport mechanism. MTP includes, as by defined by CCITT7 for Signaling System No. 7, a Link Status Signaling Message Unit (LSSU) with a Status Indication (SI) field, which is used for a Status Indication Busy (SIB) code, that can be sent from the HLR to the MSC if signaling at the HLR receiving end is congested due to, for example, HLR CP overload. The SIB signal stops all signaling towards the HLR, and is sent in short intervals (<1 second) as long as the HLR is congested. When the HLR overload condition ceases, the HLR discontinues the sending of the SIB signal.

However, even though the SIB signal forces a complete stoppage of the signaling between the MSC and the HLR, the MSC will still receive a large number of location registration requests. Therefore, when the SIB signal ceases, the signaling will be as intensive as before the stoppage. This will lead to additional stoppages, resulting in a toggling effect. This regulation method is not efficient for traffic handling, nor is it an efficient usage of the MSC and HLR CP capacity.

A registration can be interrupted and rejected due to HLR congestion at two occasions. The first occasion is when the MAP signal "Subscriber Data Request" is sent from the MSC to the HLR. The second time is when the MAP signal "Location Registration" is sent from the MSC to the HLR. In both of these cases, the MAP send buffer may be congested and the signaling request rejected.

The registration process in the new MSC 20b as presented in FIG. 1 typically uses 5% of the CP capacity during normal busy hour conditions. In certain circumstances, such as system restart, the load in the MSC may increase up to and over the loadability limit (around 95% of the CP capacity) of the MSC. Around 70% of this load may occur due to registration processing as specified in FIG. 1. The registration load is high in the surrounding MSC's as well, due to the roaming between MSC's, as described previously.

The registration process uses up to 70% of the CP capacity typically used by a successful registration towards the HLR in the MSC when the registration process is interrupted and a registration reject signal is replied to the mobile due to HLR congestion. This percentage of CP capacity is ultimately wasted. For example, if the first signaling attempt is rejected due to HLR congestion, 25% of the CP capacity needed in the MSC for a complete registration may have already been used. If the second signaling attempt is rejected due to HLR congestion, up to 82% of the CP capacity needed in the MSC for a complete registration may have been used.

Likewise, in the HLR, approximately 50% of the CP capacity for a complete registration may already have been used for a registration that is later rejected due to congestion. For example, if the second MAP signal is rejected, that registration attempt has typically already used 43% of the CP capacity needed for a complete registration in the HLR, by processing the first MAP message. As such, that CP capacity already used in the HLR, has been wasted. As a whole, if 50% of the MAP signals congested by the HLR are first MAP messages and 50% are second MAP messages, then 22% of the CP capacity needed for a complete registration in the HLR has been wasted on average.

It is, therefore, an object of the present invention to efficiently regulate the traffic conditions in the MSC and HLR to prevent an HLR overload condition.

It is a further object of the present invention to reduce, but not eliminate, the number of registration requests sent by the MSC to the HLR based on the current load in the HLR to protect against an HLR overload condition.

SUMMARY OF THE INVENTION

The present invention is directed to telecommunications systems and methods for managing congestion in the HLR. At regular intervals or in response to receiving a registration message, the HLR can transmit the current load conditions in the HLR to one or more MSC's within the area served by the HLR. In response, the MSC's can use this load information to reduce the registration intensity in order to protect the HLR from congestion. Each MSC can include one or more HLR load thresholds, and if the current load level in the HLR is above one of these thresholds, the MSC can reduce the number of registration messages sent to the HLR by a certain amount. This can be accomplished by the MSC intelligently discarding or restricting new registration requests originating from the MS's served by the MSC. Alternatively, the HLR can store the threshold information for each MSC within the area served by the HLR, and transmit an access rate (reduction amount of registration requests) to each MSC, which can use this information to discard or restrict new registration requests.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
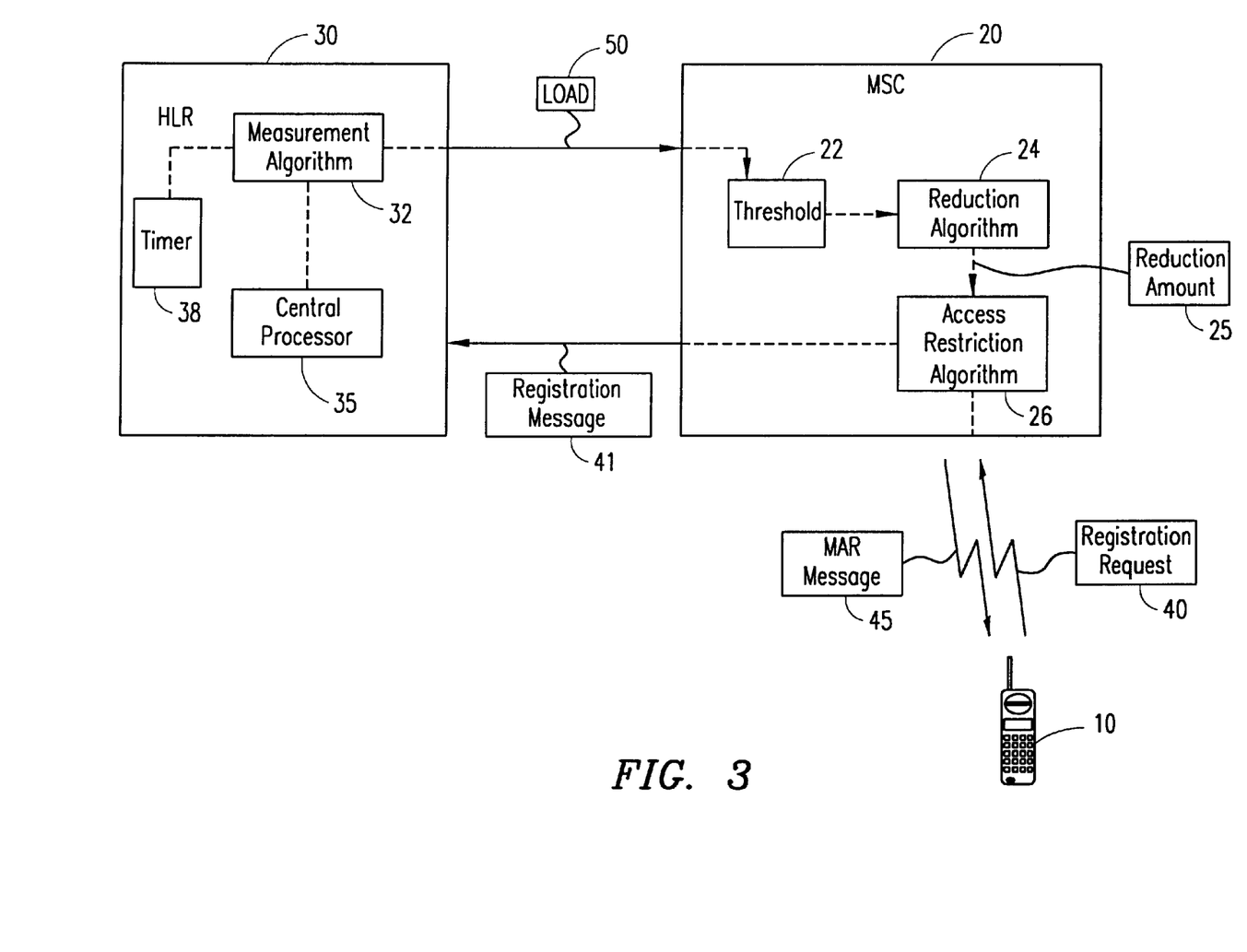
FIG. 3 is a block diagram illustrating the functionality for reducing the number of registration messages received at the HLR in order to reduce HLR congestion, in accordance with embodiments of the present invention.
Figure 4:
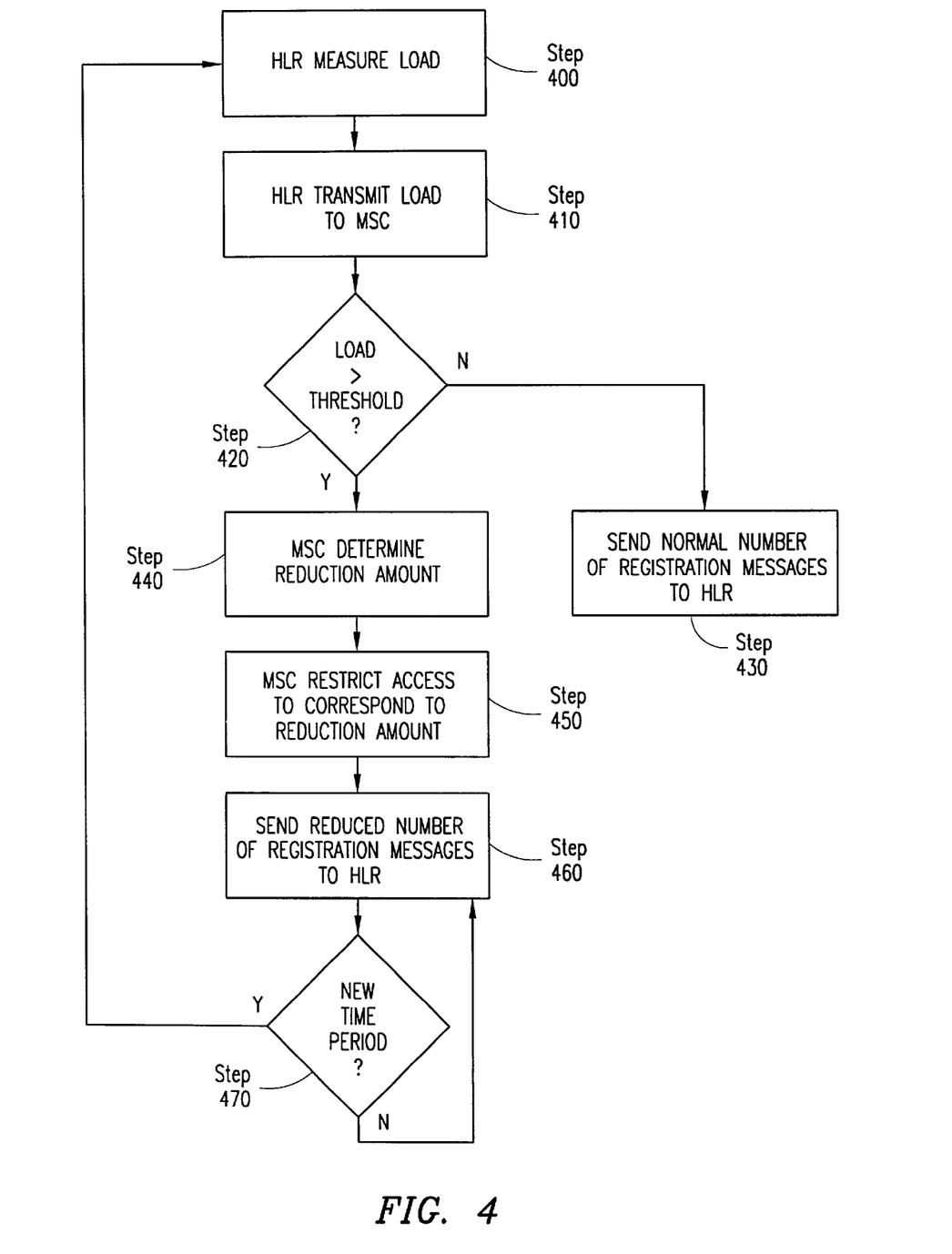
FIG. 4 is a flow diagram illustrating the steps for reducing the number of registration messages sent by the MSC to the HLR, in accordance with embodiments of the present invention.

With reference now to FIG. 3 of the drawings, which will be described in connection with the steps listed in FIG. 4 of the drawings, in order to protect the HLR 30 from a congestion condition, the HLR 30 can continuously monitor the HLR central processor 35 load. This can be accomplished by a measurement algorithm 32 within the HLR 30 accessing the central processor 35 to determine the current load 50 on the central processor 35 (step 400). The load 50 is preferably expressed as a percentage of the central processor 35 capacity currently being utilized by the HLR 30, although it should be understood that any type of load measurement would suffice.

Figure 5A:
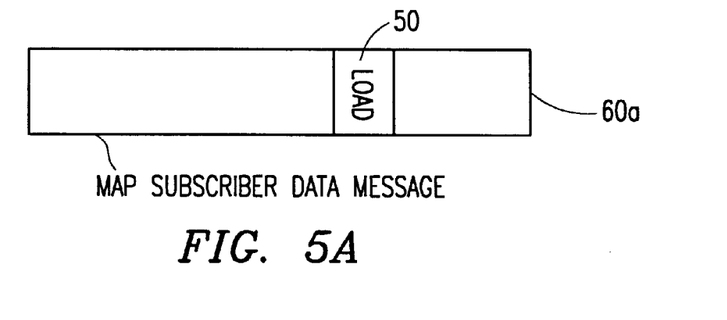
FIGS. 5A–5C illustrate various messages sent from the HLR to the MSC that can include the HLR load level.
Figure 5B:
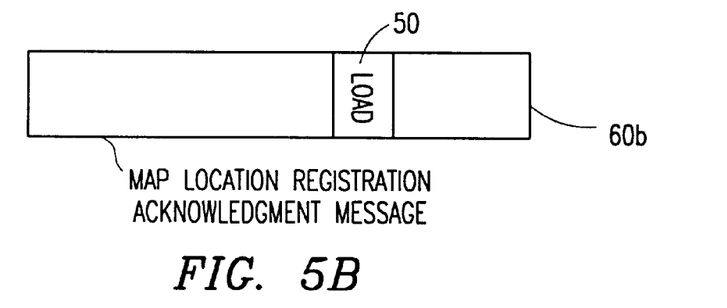
Figure 5C:
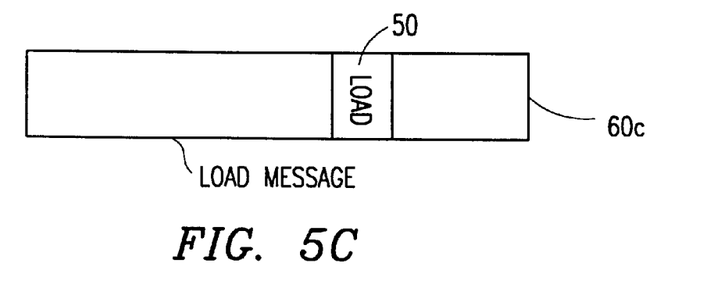

Either in response to receiving a registration message 41 associated with an MS 10 registration request 40 from an MSC 20 within the cellular network associated with the HLR 30 or at periodic intervals (e.g. at the expiration of a timer 38 within the HLR 30), the HLR 30 can transmit the current central processor load 50 to the MSC 20 (step 410). For example, as shown in FIG. 5A, the load 50 can be included within the MAP Subscriber Data message 60a that is transmitted from the HLR 30 to the MSC 20 in response to receiving the MAP Subscriber Data Request message 41 from the MSC 20 (as shown in FIG. 2 of the drawings). Alternatively, as shown in FIG. 5B of the drawings, the load 50 can be included within the MAP Location Registration Acknowledgment message 60b that is transmitted from the HLR 30 to the MSC 20 in response to receiving the Location Registration message 41 from the MSC 20. As a further alternative, as shown in FIG. 5C of the drawings, the load 50 can be included within a new Load message 60c that is transmitted from the HLR 30 to the MSC 20 periodically.

It should be noted that the new Load message 60c can also be used in conjunction with the response messages 60a and 60b sent by the HLR 30. For example, if the HLR 30 has not received a registration message 41 from the MSC 20 within a predetermined period of time, the HLR 30 can transmit the Load message 60c to the MSC 20. Otherwise, the HLR 30 can simply include the load 50 within one of the two above-mentioned response messages 60a or 60b.

Once the MSC 20 receives the central processor load 50, the MSC 20 compares the load 50 to one or more thresholds 22 that are stored within the MSC 20 (step 420). If the load 50 is above one of the thresholds 22, the MSC 20 determines a reduction amount 25 to intelligently reduce the intensity of registration messages 41 sent by the MSC 20 to the HLR 30 using a reduction algorithm 24 stored within the MSC 20 (step 440). It should be noted that there are a number of different reduction algorithms 24 that can be used to intelligently reduce the registration intensity, only some of which are discussed hereinbelow.

As a first example, the reduction algorithm 24 can simply be a one-to-one correlation between the HLR load 50 and the percentage of the reduction. Assume that the MSC 20 has three thresholds 22 (70%, 80% and 90%) stored therein. Then, if the HLR load 50 is above 70%, but below 81%, the MSC 20 can reduce the rate of transmission of registration messages 41 by a certain percentage, such as 20%. Therefore, if the MSC 20 was previously transmitting ten registration messages 41 per second, the MSC 20 would reduce the number of registration messages 41 transmitted to eight per second. Likewise, if the HLR load 50 is above 80%, but below 91%, the MSC 20 can reduce the rate of transmission of registration messages 41 by another percentage, such as 40%, and if the HLR load 50 is above 90%, the MSC 20 can reduce the rate of transmission of registration messages 41 by a third percentage, such as 80%.

As a second example of how the MSC 20 can intelligently reduce the registration intensity, the reduction algorithm 24 can take into account not only the HLR load 50, but also the number of registration messages 41 that the MSC 20 transmits to the HLR 30 within a predefined time period, which can be determined by the timer 38 shown within the HLR 30 and a similar timer (not shown) within the MSC 20. The number of registration messages 41 sent by the MSC 20 to the HLR 30 within this time period is referred to hereinbelow as #RM sent by MSC 20. In addition, the reduction algorithm 24 can consider the total number of registration messages 41 received by the HLR 30 from all MSC's 20 within the cellular network within that predefined time period (referred to hereinbelow as #RM received by HLR 30). Furthermore, the reduction algorithm 24 can be based upon a priority associated with the MSC 20. The priority can be set based upon the type of customers within the area served by the MSC 20 (e.g. if the MSC 20 serves mainly business customers with higher tariff rates, that MSC 20 may be given a higher priority) or upon the location of the MSC 20 (e.g. if the MSC 20 serves a congested area, such as a highway, that MSC 20 may be given a higher priority).

For example, assume that there are three MSC's 20 (MSC1, MSC2 and MSC3) within the cellular network, each having a different priority (MSC1 having the highest priority, MSC2 having a medium priority and MSC3 having the lowest priority). Also assume that each priority has a different priority variable (referred to hereinbelow as MSC PV) associated therewith. Furthermore, assume that the following settings are predefined within each MSC:

MSC1
   If HLR load>70%, set restriction to A1%
   If HLR load>80%, set restriction to B1%
   If HLR load>90%, set restriction to C1%
MSC2
   If HLR load>70%, set restriction to A2%
   If HLR load>80%, set restriction to B2%
   If HLR load>90%, set restriction to C2%
MSC3
   If HLR load>70%, set restriction to A3%
   If HLR load>80%, set restriction to B3%
   If HLR load>90%, set restriction to C3%

Using the above settings, if the HLR load 50 is above at least 70%, each MSC 20 would reduce the number of registration messages 41 by the following equation:

$$\max[((\#RM \text{ to reduce by } MSC(i)/\#RM \text{ sent by } MSC(i)) + MSC(i)PV), (restriction(i) + MSC(i)PV)], \text{ where}$$

$$\#RM \text{ to reduce by } MSC(i) = (\#RM \text{ sent by } MSC(i)/\#RM \text{ received by } HLR)*(Current\ HLR\ load - Ideal\ HLR\ load)/Ratio\ of\ HLR\ CP\ capacity\ each\ RM\ takes)). \quad \text{(Equation 1)}$$

The percentage of CP capacity of the HLR that each RM takes is calculated taking the current HLR load divided by the number of RM received by the HLR. It should be noted that the ideal HLR load is 70%, which is the recommended load limit. It should also be noted that the total number of RM received by the HLR 30 from all of the MSCs 20 is transmitted from the HLR 30 to the MSCs 20 prior to calculating the reduction amount. It should be understood that if the HLR load 50 is below any of the thresholds 22 stored within the MSC 20 (in this case the lowest threshold in any MSC 20 is 70%), the MSC 20 would not take any action to reduce the intensity of registration messages 41 (step 430).

To illustrate a sample implementation of the above equation, assume that the MSC priority variable PV of MSC1 (highest priority) is 0.00, the MSC priority variable of MSC2 (medium priority) is 0.05 and the MSC priority variable of MSC3 (lowest priority) is 0.10. In addition, assume that the HLR load 50 is 75% and the total number of registration messages 41 received by the HLR 30 within the latest predefined time period is 200. Of this 200, assume that MSC1 transmitted 40 registration messages 41, MSC2 transmitted 150 registration messages 41 and MSC3 transmitted 10 registration messages 41. Also assume that A1 (the restriction associated with MSC1 for HLR loads over 70% but lower than 80%) is 10%, A2 (associated with MSC2) is 20% and A3 (associated with MSC3) is 30%.

Plugging these numbers into the above equations, the ratio of HLR CP capacity that each registration message takes is: 0.75/200=0.00375. Therefore, the #RM to reduce by MSC1 is: (40/200)*((0.075−0.7)/0.00375)=0.2*13.3= 2.66. Finally, MSC1 would need to reduce the number of registration messages 41 that it transmits to the HLR 30 by the following: max[((2.66/40)+0.00), (0.10+0.00)]=max [0.0665, 0.10]=0.10.

Thus, taking the number of registration messages 41 sent by MSC1 to the HLR 30 within the last predefined time period as a standard, MSC1 would need to reduce the number of transmitted registration messages 41 by 4 (40*0.1=4). Therefore, during the next predefined time period, MSC1 would only be able to transmit 36 registration messages 41 towards the HLR 30.

For MSC2, the registration intensity would need to be reduced by: max[((9.975/150)+0.05), (0.05+0.20)]=0.25. Therefore, MSC2 would need to restrict 38 (150*0.25) registration messages 41 during the next predefined time period, forcing MSC2 to transmit only 112 registration messages 41. For MSC3, the registration intensity would need to be reduced by: max[((0.665/10)+0.10), (0.10+ 0.30)]=0.40. Therefore, MSC3 would need to restrict 4 (10*0.4) registration messages 41 during the next predefined time period, forcing MSC3 to transmit only 6 registration messages 41.

The above equation will regulate the HLR load to 70% quite well if the number of incoming registration messages from the MSC's is stable (low variance). However, if the number of incoming registration messages varies widely, the following equation may regulate the HLR load better:

$$\min[(\#RM \text{ sent by } MSC(i)/\#RM \text{ received by } HLR), restriction(i) + MSC(i)PV]. \quad \text{(Equation 2)}$$

It should be understood that the restriction percentages for each MSC 20 (A%, B% and C%) can vary depending upon the time of day or day of week to account for different demands on the network at different times of day. For example, the restriction percentage for MSC's 20 that cover mostly residential areas can be higher during the day and lower at night, while the restriction percentage for MSC's 20 that cover mostly business areas can be lower during the day and higher at night.

Thus, by this adaptive reduction algorithm 24, the MSC 20 registration adaption thresholds 22 can be set individually such that each MSC 20 reduces the registration message rate not only based upon the HLR load 50, but also upon the traffic conditions and MSC 20 priority. It should also be understood that this adaptive reduction algorithm 24 may be further refined to take into account a maximum percentage of the HLR central processor 35 capacity that each MSC 20 is allowed to use (e.g. MSC3 may be allowed to use up to 20% of the central processor 35 capacity as long as there is at least 20% free capacity in the central processor 35). Further modifications may be made to the adaptive reduction algorithm 24 as required by the operator of the cellular network (HLR 30) and/or MSC 20.

Referring again to FIGS. 3 and 4 of the drawings, once the MSC 20 has determined the reduction amount 25 (step 440), in order to continue to effectively process registration requests 40 received at the MSC 20 from MS's 10 within the area served by the MSC 20 leading to registration messages 41, the MSC 20 must use an access restriction algorithm 26 to intelligently discard new registration requests 40 sent by MS's 10 to the MSC 20 (step 450). The access restriction algorithm 26 ensures that the MSC 20 sends only the reduced amount of registration messages 41 instead of the normal amount of registration messages 41 to the HLR 30 (step 460). It should be understood that a number of different access restriction algorithms 26 can be used to discard new registration requests 40 in order to comply with the reduced registration message 41 number allowed by the MSC 20, only some of which are discussed hereinbelow.

Taking the first example of the reduction algorithm 24 discussed hereinbefore, if the HLR load 50 was above 70%, but below 80%, and the MSC 20 (e.g. MSC3) had previously sent ten registration messages 41 per second, MSC3 now would only be able to send eight registration messages 41 per second. This could easily be implemented by MSC3 accepting the first eight registration requests 40 that it received each second and discarding all of the others. This would require all of the MS's 10 that have had their registration requests 40 discarded to continuously send new registration requests 40 until MSC3 accepts them.

As another example of an access restriction algorithm 26, the MSC 20 can utilize the mobile access class information associated with the MS's 10 within the area served by the MSC 20. Each MS 10 currently has a mobile access class associated therewith. The classes can be associated with the type of customer (business or personal), type of plan (high rate or low rate) or any other distinguishing factor. For example, in the Global System for Mobile Communications (GSM) network, each MS 10 belongs to one of 15 mobile classes. Other mobile standards, such as D-AMPS and PDC, have different numbers of classes. In order to reduce the number of registration requests 40 being sent to the MSC 20 by the MS's 10, the MSC 20 can continuously transmit a message 45 including mobile access restriction control information to all of the MS's 10 within the coverage area of the MSC 20. In this message 45, one or more mobile classes will be restricted from transmitting registration requests 40. This indirectly reduces the number of registration messages 41 sent from the MSC 20 to the HLR 30.

This example can preferably be combined with the previous example, such that if the reduction produced by eliminating one or more classes is not enough, specific registration requests 40 may also be discarded. As an example, assume that there are only four classes, numbered 1–4. Also assume that the following settings are stored within the MSC 20:

If reduction amount<6, then restrict Class 4.
If reduction amount<11, then restrict Classes 3–4.
If reduction amount<16, then restrict Classes 2–4.
If reduction amount>15, then restrict all Classes.

The above settings can be used by the MSC 20 to intelligently reduce the number of registration messages 41 sent towards the HLR 30. Thus, once the MSC 20 has determined the reduction amount 25 (the number of registration messages 41 that cannot be sent during the next predefined time period), the MSC 20 can access the above-listed settings to ensure that the number of registration messages 41 is reduced appropriately.

It should be understood that the settings can be modified at any time by the operator based upon statistics indicating the average number of registration requests 40 leading to registration messages 41 per class in a given time period. In addition, it should be understood that the settings can be adaptively set based upon the time of day or day of week to account for different average numbers of registered MS's 10 per class at different times of day or days of the week.

Using the above settings, assume that the reduction amount 25 determined by the reduction algorithm 24 is twelve. Then, the MSC 20 would transmit a message 45 containing mobile access restriction control information indicating that Classes 2–4 are currently restricted from sending registration requests 40 to all of the MS's 10 within the coverage area of the MSC 20. Upon receiving this message 45, each MS 10 within the coverage area of the MSC 20 of Class 2, 3 or 4 will refrain from sending a registration request 40 towards that MSC 20 until a new message 45 is received indicating that the class that the MS 10 belongs to is no longer restricted.

Referring again to FIGS. 3 and 4, after each predefined time period (step 470), which as stated hereinbefore can be determined by the timer 38 shown within the HLR 30, the HLR 30 again measures the load 50 (step 400) and transmits the load 50 to the MSC 20 (step 410), which repeats the process of determining whether the load 50 exceeds any stored threshold 22 (step 420), and if so, reducing the number of registration messages 41 accordingly (steps 440–460). Once the HLR load 50 is below all of the thresholds 22 (step 420), the MSC 20 can begin to send registration messages 41 normally as the MSC 20 receives registration requests 40 (step 430).

However, if the MSC 20 had previously restricted one or more classes of MS's 10 from transmitting registration requests 40 during the previous time period, in order to prevent an overload condition during the next time period in the MSC 20 and/or HLR 30, the MSC 20 can gradually allow one or more classes to send registration requests 40 over a period of time instead of immediately allowing all classes to transmit.

For example, assume that, as in the above example, Classes 2–4 were restricted in the previous time period. If the MSC 20 determines that the HLR load 50 in the next time period does not exceed any threshold 22 (and therefore no restriction on registration messages 41 is required), the MSC 20 can transmit a message 45 indicating that only Classes 3–4 are restricted (now allowing Class 2 to send registration requests 40), and after a certain time interval (e.g. 20–25 seconds), transmit another message 45 indicating that only Class 4 is restricted, and so on, until all classes are allowed to send registration requests 40. This progressive process of allowing classes to transmit registration requests 40 also applies to the situation where the MSC 20 determines that a different reduction amount 25 (lower than the previous reduction amount 25) now applies.

Intelligently reducing the number of registration messages 41 sent by each MSC 20 towards the HLR 30 effectively eliminates rejections on MSC 20 and HLR 30 registration processes currently in progress, which saves processing load at the MSC 20 and at the HLR 30. For example, instead of wasting on average 53% or at most 82% central processor capacity needed in the MSC 20 for a complete registration, only 25% at most will be wasted. Likewise, in the HLR 30, the wasted central processor 35 capacity needed for a complete registration is reduced from on average 22% or at most 43% to 0%. In addition to gaining capacity, the above-described system and method also provides smooth regulation, which improves the completed registration efficiency for the cellular network (MSC 20+HLR 30).

Figure 6:
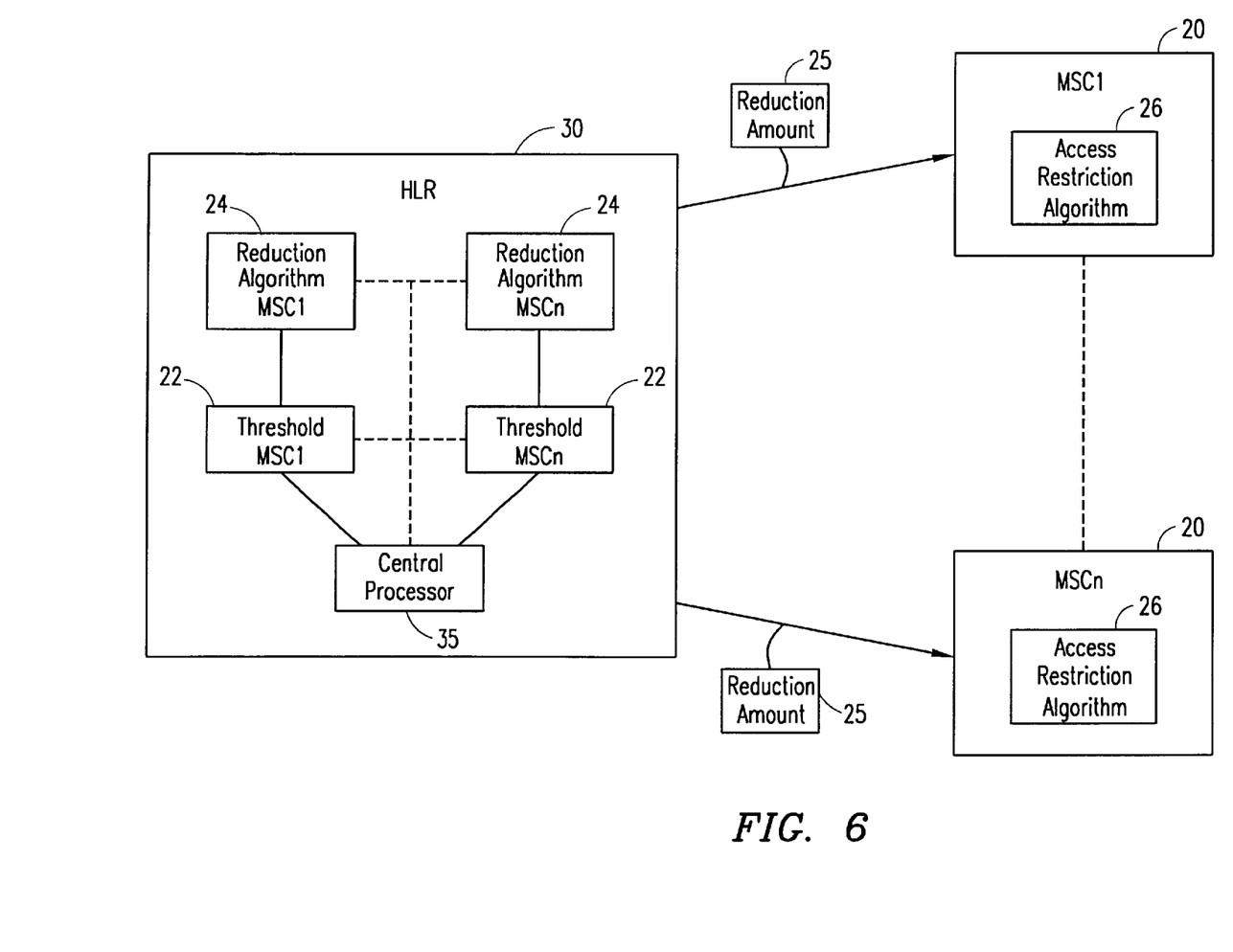
FIG. 6 is a block diagram illustrating an alternative implementation for reducing the number of registration messages received at the HLR.

In an alternative embodiment, with reference now to FIG. 6 of the drawings, instead of implementing the thresholds 22, reduction algorithms 24 and associated access restriction algorithms 26 within each MSC 20, one or more of these elements can be included within the HLR 30. As an example, as shown in FIG. 6, the HLR 30 can store the thresholds 22 for each MSC 20 within the coverage area of the HLR 30 (MSC1 . . . MSCn) along with the associated reduction algorithms 24. Once the HLR 30 has measured the load in the central processor 35, the HLR 30 compares the load to each of the thresholds 22 for each of the MSC's 20, and determines an appropriate reduction amount 25 utilizing the associated reduction algorithms 24. Thereafter, the HLR 30 can transmit the respective reduction amounts 25 to each of the MSC's 20, which can then use this information to intelligently discard new registration requests based upon their access restriction algorithms 26.

Alternatively, it should be understood that the HLR 30 can also store the access restriction algorithms 26 for each of the MSC's 20, and transmit to the MSC's 20 their respective restriction requirements. However, since each MSC 20 may utilize a different or uniquely tailored access restriction algorithm 26, it is generally preferable for each MSC 20 to store at least their respective access restriction algorithm 26. In addition, since implementing one or more of these elements (thresholds 22, reduction algorithms 24 and access restriction algorithms 26) within the HLR 30 adds to the HLR 30 load, this embodiment is less preferable.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for managing congestion within a home location register within a cellular network, said telecommunication system comprising:
    a central processor within said home location register, said central processor having a current load associated therewith;
    at least one mobile switching center physically separate from and in communication with said home location register, said at least one mobile switching center being capable of receiving registration requests from mobile stations in wireless communication with said at least one mobile switching center and transmitting at least one registration message associated with each of said registration requests to said home location register;
    wherein said home location register periodically transmits said current toad to said at least one mobile switching center;
    at least one threshold associated with said at least one mobile switching center, said current load being compared with said at least one threshold;
    a reduction algorithm associated with said at least one mobile switching center, said reduction algorithm being capable of determining a reduction amount when said current load exceeds said at least one threshold; and
    an access restriction algorithm associated with said at least one mobile switching center, said access restriction algorithm being capable of receiving said reduction amount and reducing the number of said at least one registration message transmitted from said mobile switching center to said home location register by at least said reduction amount.

2. The telecommunications system of claim 1, wherein said at least one threshold, said reduction algorithm and said access restriction algorithm are within said mobile switching center.

3. The telecommunications system of claim 1, wherein at least one of said at least one threshold, said reduction algorithm and said access restriction algorithm is within said home location register.

4. The telecommunications system of claim 1, further comprising:
    a measurement algorithm within said home location register adapted to measure said load within said central processor.

5. The telecommunications system of claim 1, further comprising:
    a timer within said home location register, said timer being initialized with a predetermined time period, said current load being measured at the expiration of said timer, said timer being reinitialized with said predetermined time period after said current load is measured.

6. The telecommunications system of claim 5, wherein said current load is compared with said at least one threshold at the beginning of each said predetermined time period.

7. The telecommunications system of claim 1, wherein said current load is a percentage of the capacity of said central processor currently in use.

8. The telecommunications system of claim 7, wherein said reduction amount is based upon said percentage.

9. The telecommunications system of claim 1, wherein said access restriction algorithm accepts only a certain number of registration requests within a predefined time period, said certain number being based upon said reduction amount.

10. The telecommunications system of claim 1, wherein each of said mobile stations has one of a plurality of mobile classes associated therewith, said access restriction algorithm restricting said mobile stations associated with one or more of said mobile classes from transmitting registration requests to said mobile switching center based upon said reduction amount.

11. A method for managing congestion within a home location register within a cellular network, said home location register being in communication with at least one mobile switching center physically separate from said home location register, said at least one mobile switching center being capable of receiving registration requests from mobile stations in wireless communication with said at least one mobile switching center and transmitting at least one registration message associated with each of said registration requests to said home location register, said method comprising the steps of:
    measuring a current load of a central processor within said home location register;
    comparing said current load with at least one threshold associated with said at least one mobile switching center;

determining a reduction amount when said current load exceeds said at least one threshold;

periodically transmitting said current load or said reduction amount from said home location register to said at least one mobile switching center; and reducing the number of said at least one registration message transmitted from said at least one mobile switching center to said home location register as a function of said current load or said reduction amount.

12. The method of claim 11, wherein said step of measuring further comprises the steps of:

initializing a timer within said home location register with a predetermined time period;

measuring said current load at the expiration of said timer; and reinitializing said timer with said predetermined time period after said current load is measured.

13. The method of claim 12, wherein said step of comparing further comprises the step of:

comparing said current load with said at least one threshold at the beginning of each said predetermined time period.

14. The method of claim 11, wherein said current load is a percentage of the capacity of said central processor currently in use.

15. The method of claim 14, wherein said reduction amount is based upon said percentage.

16. The method of claim 11, wherein said step of reducing further comprises the step of:

accepting only a certain number of registration requests at said at least one mobile switching center within a predefined time period, said certain number being based upon said reduction amount.

17. The method of claim 11, wherein each of said mobile stations has one of a plurality of mobile classes associated therewith, and wherein said step of reducing further comprises the step of:

restricting said mobile stations associated with one or more of said mobile classes from transmitting registration requests to said mobile switching center based upon said reduction amount.

18. A telecommunications system for controlling the number of registration messages associated with registration requests transmitted within a cellular network, said telecommunications system comprising:

a home location register within said cellular network, said home location register being capable of measuring a current load of said home location register; and at least one mobile switching center physically separate from and in communication with said home location register;

wherein said home location register periodically transmits a message containing an indicia of said current load to said mobile switching center, said indicia comprising said current load or a computed reduction amount that is a function of said current load, said at least one mobile switching center being capable of receiving said message containing said indicia from said home location register and reducing the number of said registration messages transmitted from said at least one mobile switching center to said home location register as a function of said indicia.

19. The telecommunications system of claim 18, wherein said at least one mobile switching center is further capable of determining a reduction amount used by said at least one mobile switching center in reducing the number of said registration messages transmitted to said home location register.

20. The telecommunications system of claim 19, wherein said at least one mobile switching center is further capable of accepting only a certain number of registration requests from mobile stations in wireless communication with said at least one mobile switching center within a predefined time period, said certain number being based upon said reduction amount.

21. The telecommunications system of claim 19, wherein said at least one mobile switching center is further capable of transmitting a message to mobile stations in wireless communication with said at least one mobile switching center restricting certain ones of said mobile stations from transmitting registration requests to said mobile switching center, said certain ones being determined based upon said reduction amount.

22. The telecommunications system of claim 18, wherein said home location register is further capable of measuring said current load at predefined time Intervals.

23. The telecommunications system of claim 18, wherein said message comprises a registration request response message transmitted from said home location register to said mobile switching center.

* * * * *